(12) United States Patent
Li et al.

(10) Patent No.: US 8,871,859 B2
(45) Date of Patent: Oct. 28, 2014

(54) CROSSLINKED PIGMENT DISPERSION BASED ON STRUCTURED VINYL POLYMERIC DISPERSANTS

(75) Inventors: Xiaoqing Li, Newark, DE (US); Christian Jackson, Wilmington, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 13/510,010

(22) PCT Filed: Nov. 23, 2010

(86) PCT No.: PCT/US2010/057726
§ 371 (c)(1),
(2), (4) Date: May 16, 2012

(87) PCT Pub. No.: WO2011/063374
PCT Pub. Date: May 26, 2011

(65) Prior Publication Data
US 2012/0245233 A1    Sep. 27, 2012

Related U.S. Application Data

(60) Provisional application No. 61/263,625, filed on Nov. 23, 2009.

(51) Int. Cl.
*C08F 265/06* (2006.01)
*C09D 11/326* (2014.01)
*C08F 293/00* (2006.01)

(52) U.S. Cl.
CPC ........... *C08F 265/06* (2013.01); *C08F 2438/00* (2013.01); *C08F 293/005* (2013.01); *C09D 11/326* (2013.01)
USPC ........... 524/556; 524/504; 524/502; 524/608; 524/500; 523/219; 514/772.1

(58) Field of Classification Search
CPC ............... C08F 265/06; C08F 293/005; C08F 2438/00; C08D 11/326; C08K 3/40; C08K 47/34; C08L 33/02; C08L 51/00
USPC .......... 524/556, 504, 502, 608, 500; 523/219; 514/772.1
See application file for complete search history.

(56) References Cited

U.S. PATENT DOCUMENTS

| | | | |
|---|---|---|---|
| 4,490,728 A | 12/1984 | Vaught et al. | |
| 5,085,698 A | 2/1992 | Ma et al. | |
| 5,852,075 A | 12/1998 | Held | |
| 6,161,918 A | 12/2000 | Bailey et al. | |
| 6,648,763 B2 | 11/2003 | Ash et al. | |
| 2003/0078320 A1* | 4/2003 | Yatake | 523/160 |
| 2003/0171483 A1* | 9/2003 | Ikegami et al. | 524/543 |
| 2004/0082686 A1* | 4/2004 | Takahashi et al. | 523/160 |
| 2004/0142270 A1* | 7/2004 | Qian et al. | 430/114 |
| 2005/0090599 A1 | 4/2005 | Spinelli | |
| 2005/0256225 A1* | 11/2005 | Viola | 523/160 |
| 2007/0270510 A1* | 11/2007 | Liu | 516/72 |

OTHER PUBLICATIONS

Corresponding case PCT/US2010/057726, International Search Report WIPO Office, Geneva, Switzerland, Authorized Officer Nora Linder, Jun. 7, 2012.

* cited by examiner

Primary Examiner — Michael M Bernshteyn
(74) Attorney, Agent, or Firm — John H. Lamming

(57) ABSTRACT

The present disclosure provides an aqueous dispersion comprising a solid particle and a structured vinyl polymeric dispersant, wherein said structured vinyl polymer dispersant comprises at least one hydrophilic segment and at least one hydrophobic segment, the hydrophilic segment comprising at least one crosslinkable moiety, wherein the crosslinkable moiety is cross-linked with a crosslinking agent that is substantially insoluble in the aqueous ink vehicle.
These dispersions when used in ink jet inks provide images with the requisite optical density and chroma needed for emerging ink jet applications.

25 Claims, No Drawings

CROSSLINKED PIGMENT DISPERSION BASED ON STRUCTURED VINYL POLYMERIC DISPERSANTS

CROSS-REFERENCE TO RELATED APPLICATION

This application claims priority under 35 U.S.C. §119 from U.S. Provisional Application Ser. No. 61/263,625, filed Nov. 23, 2009.

BACKGROUND OF THE DISCLOSURE

This disclosure relates to novel, stable aqueous dispersions of solid particles, the crosslinked polymeric dispersants that produce the stable aqueous particle dispersions, the process of making the same and the use thereof in ink jet inks.

Aqueous dispersions of solid particles are known in the art and have been used in various applications such as, for example, inks for printing (particularly ink jet printing); waterborne paints and other coating formulations for vehicles, buildings, road markings and the like; cosmetics; pharmaceutical preparations; etc. For examples, pigment particles are typically not soluble in an aqueous ink vehicle; it is often required to use dispersing agents, such as polymeric dispersants or surfactants, to produce a stable dispersion of the pigment in the aqueous ink vehicle.

An application of the present disclosure relates to an ink (printing liquid) useful for writing utensils such as aqueous ball point pens, fountain pens and felt-tip pens; continuous and on-demand type inkjet printers of a thermal jet type, a piezo type and the like; and an inkjet printing method employing the ink.

There has been effort in the art directed at improving the stability of the dispersions so that the particles are less likely to settle out of the vehicle under defined set of conditions. The effort to improve dispersion stability to date has included improvements in the processes used to make the dispersions, the development of new dispersants and the exploration of the interaction between dispersants and particle, and between dispersants and aqueous ink vehicle. While much of the effort has general application at improving dispersion stability, some of that effort has not found utility in particular applications. For example, the pigment dispersions used in ink jet printing applications have very unique and demanding requirements. It is critical that ink components comprising pigment dispersion remain stable, not only in storage but also over repeated jetting cycles.

There continues to be a need for highly stable, higher-quality and different property inks for inkjet ink applications. Although improvements in polymeric dispersants have significantly contributed to improved inkjet inks, the current dispersants still do not provide inks with requisite stability, optical density and chroma needed for emerging ink jet applications. The present invention satisfies this need by providing a dispersion stabilized by a structured vinyl polymer dispersant having crosslinkable moieties crosslinked with a crosslinking agent.

SUMMARY OF THE DISCLOSURE

In a first aspect, the disclosure provides an aqueous dispersion comprising a solid particle and a structured vinyl polymeric dispersant, wherein said structured vinyl polymer dispersant comprises at least one hydrophilic segment and at least one hydrophobic segment, the hydrophilic segment comprising at least one crosslinkable moiety, wherein the crosslinkable moiety is cross-linked with a crosslinking agent that is substantially insoluble in the aqueous ink vehicle.

Typically the solid particle is selected from the group consisting of a colorant, such as pigment or insoluble dye, filler, such as silica, metallic particle, pharmaceutically active compound, polymer particle and hollow glass sphere.

DETAILED DESCRIPTION OF THE DISCLOSURE

The aqueous dispersions of this disclosure comprise a solid particle and a crosslinked structured vinyl polymeric dispersant. Further the ink jet inks comprise an aqueous ink vehicle and the aqueous dispersions.

These inks provide images with the requisite stability, optical density and chroma needed for emerging ink jet applications.

Aqueous Dispersions:
Solid Particle:

Although solid particles are required for the disclosure, the type and composition of the solid particle is not particularly critical and will largely depend upon the ultimate end use application of the aqueous dispersion. By definition, the solid particle is at least substantially insoluble in the liquid vehicle, typically water. Apart from that general limitation, the solid particle may be organic, inorganic or mixtures thereof. Suitable examples of solid particles include colorants such as pigments and insoluble dyes, fillers such as silica, metallic particles, pharmaceutically active compounds, polymer particles, hollow glass spheres, and the like. Most suitable solid particles are colorants, especially pigments and insoluble dyes.

A wide variety of organic and inorganic pigments, alone or in combination, may be selected to make the aqueous dispersion and ink jet ink. The term "pigment" as used herein means an insoluble colorant. The dispersed pigment particles are sufficiently small to permit free flow of the ink through the ink jet printing device, especially at the ejecting nozzles that usually have a diameter ranging from about 10 micron to about 50 micron. The particle size also has an influence on the aqueous dispersion stability, which is critical throughout the life of the ink jet ink. The concept of Brownian motion of minute particles helps prevent the particles from flocculation. It is also desirable to use small particles for maximum color strength and gloss. The range of useful sizes for the solid particle is typically about 0.003 micron to about 15 microns. Typically, the dispersed pigment particle size is in the range from about 0.003 to about 1 micron, more typically about 0.003 to about 0.9 micron, still more typically about 0.004 to about 0.5 micron, and most typically, from about 0.004 to about 0.2 micron.

The selected pigment(s) may be used in dry or wet form. For example, pigments are usually manufactured in aqueous media and the resulting pigment is obtained as water-wet presscake. In presscake form, the pigment is not agglomerated to the extent that it is in dry form. Thus, pigments in water-wet presscake form do not require as much deflocculation in the process of preparing the inks as pigments in dry form. Representative commercial dry pigments are listed in U.S. Pat. No. 5,085,698.

Some examples of pigments with coloristic properties useful in ink jet inks include: (cyan) Pigment Blue 15:3 and Pigment Blue 15:4; (magenta) Pigment Red 122 and Pigment Red 202; (yellow) Pigment Yellow 14, Pigment Yellow 74, Pigment Yellow 95, Pigment Yellow 110, Pigment Yellow 114, Pigment Yellow 128 and Pigment Yellow 155; (red) Pigment Orange 5, Pigment Orange 34, Pigment Orange 43, Pigment Orange 62, Pigment Red 17, Pigment Red 49:2, Pigment Red 112, Pigment Red 149, Pigment Red 177, Pigment Red 178, Pigment Red 188, Pigment Red 255 and Pigment Red 264; (green) Pigment Green 1, Pigment Green 2, Pigment Green 7 and Pigment Green 36; (blue) Pigment Blue 60, Pigment Violet 3, Pigment Violet 19, Pigment Violet 23, Pigment Violet 32, Pigment Violet 36 and Pigment Violet 38; and (black) carbon black. Colorants are referred to herein by their "C.I." designation established by Society Dyers and Colourists, Bradford, Yorkshire, UK and published in The Color Index, Third Edition, 1971. Commercial sources of pigment are generally well known in the art.

In the case of organic pigments, the ink jet ink may contain up to approximately 30% pigment by weight, typically about 0.1 to about 25% pigment by weight, and more typically about 0.25 to about 10% pigment by weight, based on the total ink weight. If an inorganic pigment is selected, the ink will tend to contain higher weight percentages of pigment than with comparable inks employing organic pigment, and may be as high as about 75% in some cases, since inorganic pigments generally have higher specific gravities than organic pigments.

Structured Vinyl Polymeric Dispersant:

The function of the polymeric dispersant is to disperse the solid particle, more typically a colorant, in the aqueous ink vehicle. Structured polymeric dispersants are particularly preferred. The term "structured polymer" means any polymer that does not have a random structure. Stated differently, the term "structured polymer" means that the polymer has identifiable and defined segments or areas based on the type, identity and/or behavior of the monomers contained within the segment or area. Typically, but not always, those segments are characterized as being hydrophobic or hydrophilic.

Examples of structured polymers include block polymers, graft polymers, tapered polymers and branch polymers. Particularly typical structured polymeric dispersants for use in the present disclosure are block and graft copolymers. Structured polymeric dispersants are particularly useful because it is easier to produce segments having the desired functionality in such polymers versus random polymers. Graft polymers having an insoluble backbone and soluble arms are particularly typical. Such polymers can be prepared by techniques well known in the art. For example, block polymers can be made using the well known Group Transfer Polymerization technique and graft polymers may be prepared using chain transfer agents. Specific conditions for preparing particularly typical polymers are set forth in the examples.

Regardless of the structure of the polymeric dispersant, the polymeric dispersant typically contains one or more segments that are soluble in the aqueous ink vehicle (hydrophilic segment) and one or more segments that are insoluble in the aqueous ink vehicle (hydrophobic segment). As such, the polymer has an area or segment that has an affinity for the aqueous ink vehicle and an area or segment that has an aversion for the aqueous ink vehicle. When the polymer is placed into the liquid, it will naturally tend to orient itself such that the segment(s) with aversion to the liquid will cluster together to form a liquid adverse "core" and the segment(s) with affinity for the vehicle are aligned away from the core. The particles, which are insoluble and thus also have an aversion for the liquid, tend to migrate into the "core" formed by the polymer alignment. Generally speaking, the solid, particle is relatively content to stay isolated in this liquid free "core". Under certain conditions, however, such as changes in temperature, changes in composition of the aqueous ink vehicle, etc. the solid particles tend to move out of the core where they can flocculate and precipitate. The present disclosure addresses this problem by cross-linking the soluble polymer segment to form a network or matrix around the solid particle which is extremely resistant to changes in aqueous ink vehicle composition, temperature and other factors known to destabilize dispersions. The solid particle is entrapped in a network formed by the soluble polymer segment and the cross-linking bonds. The cross-linking bonds are very stable and effectively prevent the solid particle from leaving the "core" formed by the polymer. The soluble segment of the polymer remains aligned into the aqueous ink vehicle and away from the liquid adverse "core". It is not necessary that the solid particle be covalently bonded to the polymer dispersant to obtain the improved dispersion stability. However, it is understood that the dispersions of the present disclosure do not preclude situations where the solid particle, in addition to being entrapped in the cross-linked matrix, would also be covalently bonded to the polymer.

The soluble segment will contain hydrophilic monomers and the insoluble segment will contain hydrophobic monomers. It is also possible to introduce solubility by making a salt of the monomers used in the soluble segment, particularly for aqueous dispersions, as is known in the art. Whatever the precise composition of the soluble segment may be, it is important that this segment be such that the entire polymer dispersant (or a salt thereof) is soluble or dispersible in the aqueous ink vehicle.

Hydrophobic and hydrophilic monomers are well known to those skilled in the art. Particularly useful hydrophobic monomers include:

1) $C_{1-12}$ alkyl, $C_{6-12}$ aryl, and $C_{1-12}$ alkyl-$C_{6-12}$ aryl acrylates or methacrylates such as methyl, ethyl, butyl, propyl, isobutyl, hexyl 2-ethyl hexyl, nonyl, lauryl, isobornyl, benzyl acrylates and methacrylates and the like;

2) polymerizable vinyl aromatic monomers such as styrene, alpha methyl styrene, vinyl toluene and the like; and 3) aliphatic hydrocarbon monomers such as isoprene and butadiene.

Particularly useful hydrophilic monomers (i.e., those which can impart water-solubility) include: (1) acid monomers such as acrylic acid, methacrylic acid, acrylamidomethylpropane sulfonic acid, itaconic acid, maleic acid and styrene sulfonic acid; (2) amine-containing monomers such as 2-dimethylaminoethyl methacrylate, 2-dimethylaminoethyl acrylate, 2-diethylaminoethyl methacrylate, and 2-diethylaminoethyl acrylate; and (3) monomers having oligoether moieties of the Formula (I)

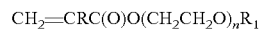

$$CH_2=CRC(O)O(CH_2CH_2O)_nR_1 \qquad \text{Formula (I)}$$

wherein R=H or methyl; $R_1=C_{1-4}$ alkyl, aryl $C_{6-12}$, or $C_{1-12}$ alkyl-$C_{6-12}$ aryl, and n=1 to 20, examples of which include ethoxyethyl methacrylate, butoxyethyl methacrylate, ethoxytriethylene methacrylate, methoxy-polyethylene glycol methacrylate, and 2-ethoxytriethylene glycol methacrylate.

It may be necessary to neutralize the monomers to make them soluble. Suitable reagents to neutralize the acid monomers include mono-, di-, tri-methylamine, morpholine, n-methyl morpholine; alcohol amines such as dimethylethanolamine (DMEA), methyldiethanolamine, mono-, di-, and triethanolamine; pyridine; ammonium hydroxide; tetraalkylammonium salts such as tetramethylammonium hydroxide, tetraethyl-ammonium hydroxide; alkali metals hydroxides such as lithium, sodium and potassium hydroxide, aminopropanol, and the like. The amine monomers may be neutralized with inorganic and organic acid such as acetic acid, formic acid, oxalic acid, dimethylol propionic acid, hydrochloric acid, p-toluene sulfonic acid, benzene sulfonic acid, nitric acid, citric acid, and the like; halogens such as chloride, fluoride, and bromide, and inorganic acids, such as sulfuric acid, nitric acid, phosphoric acid and the like. It is also possible to convert the amino group into a tetra-alkyl ammonium salt. Alternately, the amine functionalities can be rendered water-soluble by quaternization with reagents such as benzyl chloride, dimethylsulfate, methyl chloride, etc.

Depending on the number, n, of oxyethylene units in the monomers containing oligoether moieties, the polymer can be slightly or completely water soluble. The solubility of the polymer increases as the number of oxyethylene units increases. The monomers having oligoether moieties can be advantageously used to adjust the physical properties, such as Tg, of the polymer dispersant.

Crosslinked Polymeric Dispersant

The polymeric dispersants have crosslinkable functional moieties in the soluble segment that is the hydrophilic segment. The soluble segment(s) of the dispersant is thus capable of cross-linking to an additional cross-linking compound (e.g., monomer, oligomer, or polymer) that has suitable cross-linking functionality. The dispersant is thus capable of crosslinking to a crosslinking agent that has crosslinking functionality reactive with the crosslinkable moieties. Useful cross-linking compounds are those which are insoluble in the aqueous ink vehicle and which do not have significant reaction with the aqueous ink vehicle. Typically, the crosslinking of the structured vinyl polymeric dispersant occurs after the solid particle is dispersed in the structured vinyl polymeric dispersant to form an aqueous dispersion. Mole ratio of the crosslinkable moiety on the polymer chain and crosslinking functional groups on the crosslinking agent can be from about 10:1 to about 1:1.5, typically from about 9:1 to about 1:1.1, most typically from about 8:1 to about 1:1.

The list below identifies some suitable crosslinkable moieties that may be incorporated into the soluble segment of the polymeric dispersant and the companion crosslinking functional groups that may be present in the crosslinking agent.

| Crosslinkable moieties | Crosslinking functional group |
|---|---|
| Acid, —COOH | Epoxide, carbodiimide, oxazoline |
| Hydroxyl, —OH | Epoxide, silane, isocyanate |
| Amino, —NH$_2$ or NHR | Epoxide, silane, isocyanate, Carbodiimide |

As noted above, the functional moieties can be incorporated into the soluble segment of the polymeric dispersant by selection of appropriate monomers. Additionally, mixtures of these crosslinking moieties may also be present throughout the polymeric dispersant. A separate crosslinking agent having the appropriate group can be added to the dispersion to crosslink the polymeric dispersant. Useful crosslinking agents are those which are typically insoluble in the aqueous ink vehicle, including m-tetramethylxylene diisocyanate (TMXDI), isophorone diisocyanate (IPDI), trimethylopropane polyglycidyl ether, water-insoluble epoxide resin, oxazoline-functional polymers, polycarbodiimide resin, and silane. After the completion of the crosslinking, pH of the crosslinked dispersion can be adjusted to at least about 8.0, more typically about 8.0 to 12.0, and most typically about 8.0 to about 11.0.

Preparation of Particle Dispersion and Crosslinking of the Dispersants

The aqueous dispersions of the present disclosure may be prepared using any conventional milling process known in the art. Most milling processes use a two-step process involving a first mixing step followed by a second grinding step. The first step comprises the mixing of all the ingredients, i.e., particle, dispersant(s), liquid carrier(s), pH adjuster and any optional additives, to provide a blended "premix". Typically all liquid ingredients are added first, followed by the dispersant(s) and lastly the particle. Mixing is generally done in a stirred mixing vessel and High Speed Dispersers, (HSD), are particularly suitable for the mixing step. A Cowels type blade attached to the HSD and operated at 500 rpm to 4000 rpm, and typically 2000 rpm to 3500 rpm, provides optimal shear to achieve desired mixing. Adequate mixing is usually achieved by mixing for about 1.5 minutes to about 120 minutes.

The second step comprises milling of the premix to produce a stable aqueous dispersion. A typical milling process for carbon black pigments that avoids media contamination is the Microfluidizer Process, although other milling techniques can be used. In a specific embodiment, a lab scale model M-110Y High. Pressure Pneumatic, Microfluidizer with a diamond Z-Chamber from Microfluidics of Newton, Mass. can be used. The Microfluidizer uses an impingement process at high pressures to deagglomerate and mill fine particles, such as pigments. The model M-110Y Microfluidizer can operate at pressure ranges of about 3,000 to about 23,000 psi, although pressures of about 10,000 to about 15,000 are typical. The flow rates through the microfluidizer were typically about 200 to about 500 mL/min. and more typically about 300 to about 450 mL/min.

The second step milling process for color pigment typically involves a media milling process, although other milling techniques can also be used. In the present invention, a lab-scale Eiger Minimill (Model M250, VSE EXP) manufactured by Eiger Machinery Inc., Chicago, Ill. is employed. Grinding was accomplished by charging 0.5 mm YTZ® zirconia media to the mill. The mill disk is operated at a speed between 2000 rpm and 4000 rpm, and typically between 3000 rpm and 3500 rpm. The dispersion is processed using a re-circulation grinding process with a typical flow rate through the mill at between 200 to 500 grams/minute, and more typically at 300 grams/minute.

The milling can be done using a staged procedure in which a fraction of the solvent may be held out of the grind and added after milling is completed. This amount of solvent held out during milling can vary by dispersion and is typically about 100 to about 300 grams of the total 600 gram batch size. This can be done to achieve optimal rheology and viscosity for grinding efficiency. Each dispersion can be processed for a total of 10 passes through the mill although the endpoint can be achieved in less milling time.

Aqueous pigmented dispersions can be prepared using the pigments identified earlier. The premix can be prepared at typically 23% pigment loading and the dispersant level was set at a P/D (pigment/dispersant), most typically at a P/D of 2.5. A P/D of 2.5 corresponds to a 40% dispersant level on pigment The structured vinyl polymeric dispersants can typically be neutralized with either alkali metal hydroxide such as LiOH, KOH, NaOH, or amine to facilitate solubility and dissolution into water. Range of neutralization can vary from 30 mole % to 100 mole % based on the mole of ionizable groups on the dispersant resin. The neutralization process can be done either in situ during the premix stage or by pre-neutralizing the resin during the final stage of manufacture.

During the premix stage the pigment level can be maintained at about 18% to about 30%, more typically about 23%, and was reduced to about 12% to about 18%, more typically about 15% during the milling stage by adding deionized water for optimal milling conditions. After completing the milling process, the aqueous dispersions can be reduced to about 10% pigment concentration by adding the de-ionized water. Optionally, the aqueous dispersion can be further processed using conventional filtration procedures known in the art. The dispersions can be processed using ultrafiltration techniques to remove co-solvent(s) and other contaminants, ions or impurities from the dispersion. Dispersant crosslinking can then take place by adding the crosslinking agent to the aqueous dispersion comprising the dispersed solid particle. Thorough mixing at room temperature or elevated temperature for several hours is often required to achieve the crosslinking. To facilitate the crosslinking reaction, it may be desirable to add a catalyst and/or to elevate the temperature of the mixture. Useful catalysts can be those that are either soluble or insoluble in the liquid and can be selected depending upon the crosslinking reactions. Some suitable catalysts include dibutyltin dilaurate (DBTDL), tributyl amine ("TBA") and dimethyldodecyl amine. After completion of the crosslinking, pH of the crosslinked dispersion can be adjusted to at least about 8.0, more typically about 8.0 to 12.0, and most typically about 8.0 to about 11.0, if needed. The treated dispersion can then be filtered through a filter, for example, a 0.3 micron Chipwich filter, available from Pall Trincor of East Falls, N.Y., to remove any possible contaminants and filled into a polyethylene container. Optionally, the crosslinked dispersion can be processed using ultrafiltration techniques to remove co-solvent(s) and other contaminants, ions or impurities from the dispersion. Each dispersion can be then tested for pH, conductivity, viscosity and particle size.

Aqueous Ink Vehicle

The pigmented ink of this disclosure comprises an ink vehicle typically an aqueous ink vehicle, also known as an aqueous carrier medium, the aqueous dispersion and optionally other ingredients.

The aqueous ink vehicle is the liquid carrier (or medium) for the aqueous dispersion(s) and optional additives. The term "aqueous ink vehicle" refers to an ink vehicle comprised of water or a mixture of water and one or more organic, water-soluble vehicle components commonly referred to as co-solvents or humectants. Selection of a suitable mixture depends on requirements of the specific application, such as desired surface tension and viscosity, the selected pigment, drying time of the pigmented ink jet ink, and the type of paper onto which the ink will be printed. Sometimes in the art, when a co-solvent can assist in the penetration and drying of an ink on a printed substrate, it is referred to as a penetrant.

Examples of water-soluble organic solvents and humectants include: alcohols, ketones, keto-alcohols, ethers and others, such as thiodiglycol, sulfolane, 2-pyrrolidone, 1,3-dimethyl-2-imidazolidinone and caprolactam; glycols such as ethylene glycol, diethylene glycol, triethylene glycol, tetraethylene glycol, propylene, glycol, dipropylene glycol, tripropylene glycol, trimethylene glycol, butylene glycol and hexylene glycol; addition polymers of oxyethylene or oxypropylene such as polyethylene glycol, polypropylene glycol and the like; triols such as glycerol and 1,2,6-hexanetriol; lower alkyl ethers of polyhydric alcohols, such as ethylene glycol monomethyl ether, ethylene glycol monoethyl ether, diethylene glycol monomethyl, diethylene glycol monoethyl ether; lower dialkyl ethers of polyhydric alcohols, such as diethylene glycol dimethyl, or diethyl ether; urea and substituted ureas.

A mixture of water and a polyhydric alcohol, such as diethylene glycol, is typical as the aqueous ink vehicle. In the case of a mixture of water and diethylene glycol, the aqueous ink vehicle usually contains from about 30% water/about 70% diethylene glycol to about 95% water/about 5% diethylene glycol. The more typical ratios are about 60% water/about 40% diethylene glycol to about 95% water/about 5% diethylene glycol. Percentages are based on the total weight of the aqueous ink vehicle. A mixture of water and butyl carbitol is also an effective aqueous ink vehicle.

The amount of aqueous ink vehicle in the ink is typically in the range of about 70% to about 99.8%, and more typically about 80% to about 99.8%, based on total weight of the ink.

The aqueous ink vehicle can be made to be fast penetrating (rapid drying) by including surfactants or penetrating agents such as glycol ethers and 1,2-alkanediols. Glycol ethers include ethylene glycol monobutyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, 1-methyl-1-methoxybutanol, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, and dipropylene glycol mono-isopropyl ether. 1,2-Alkanediols are typical. 1,2-$C_{4-6}$ alkanediols, are more typical, 1,2-hexanediol, is most typical. Some suitable surfactants include ethoxylated acetylene diols (e.g. Surfynol® series from Air Products), ethoxylated alkyl primary alcohols e.g. Neodol® series from Shell) and alkyl secondary alcohols (e.g. Tergitol® series from Union Carbide) alcohols, sulfosuccinates (e.g. Aerosol® series from Cytec), organosilicones (e.g. Silwet® series from Witco) and fluoro surfactants (e.g. Zonyl® series from DuPont).

The amount of glycol ether(s) and 1,2-alkanediol(s) added should be properly determined, but it is typically in the range of from about 1 to about 15% by weight, and more typically about 2 to about 10% by weight, based on the total weight of the ink. Surfactants may be used, typically in the amount of about 0.01 to about 5% and typically about 0.2 to about 2%, based on the total weight of the ink.

Biocides may be used to inhibit growth of microorganisms.

Pigmented ink jet inks typically have a surface tension in the range of about 20 mN·m$^{-1}$ to about 70 mN·m$^{-1}$, at 25° C. Viscosity can be as high as 30 mPa·s at 25° C., but is typically somewhat lower. The ink has physical properties compatible with a wide range of ejecting conditions, materials construction and the shape and size of the nozzle. The inks should have excellent storage stability for long periods so as not clog to a significant extent in an ink jet apparatus. Further, the ink should not corrode parts of the ink jet printing device it comes in contact with, and it should be essentially odorless and non-toxic.

Although not restricted to any particular viscosity range or printhead, the inks of the disclosure are particularly suited to lower viscosity applications. Thus the viscosity (at 25° C.) of the inks of this disclosure may be less than about 7 mPa·s, or less than about 5 mPa·s, and even, advantageously, less than about 3.5 mPa·s.

Method of Printing:

A typical printer will generally comprise at least four differently colored inks such as a cyan, magenta, yellow and black (CMYK) ink. Ink sets may further comprise one or more "gamut-expanding" inks, including different colored inks such as an orange ink, a green ink, a violet ink, a red ink and/or a blue ink, and combinations of full strength and light strengths inks such as light cyan and light magenta. In addition, ink sets may include one or more colorless inks which are printed in combination with the colored inks to enhance properties such as optical density, chroma, durability and/or gloss.

According to one embodiment of the disclosure, a method of ink jet printing onto a substrate is provided comprising, in any workable order, the steps of:

(a) providing an ink jet printer that is responsive to digital data signals;

(b) loading the printer with a substrate to be printed;

(c) loading the printer with an ink jet ink comprising an aqueous ink vehicle and an aqueous dispersion, the aqueous dispersion comprising a solid particle and a structured vinyl polymer dispersant, wherein said structured vinyl polymer dispersant comprises at least one hydrophilic segment and at least one hydrophobic segment, the hydrophilic segment comprising at least one crosslinkable moiety, wherein the crosslinkable moiety is cross-linked with a crosslinking agent that is substantially insoluble in the aqueous ink vehicle; and (d) printing onto the substrate using the ink jet ink, in response to the digital data signals to form a printed image on the substrate.

Typically, the dispersant comprises a crosslinking moiety; wherein the crosslinking moiety is crosslinked with a crosslinking agent selected from the group consisting of epoxide, carbodiimide, oxazoline, isocyanate, and silane; and wherein the aqueous dispersion has a pH of at least about 8.0.

The inks of the present disclosure can be printed with any suitable inkjet printer, including printers equipped with piezo or thermal print heads. Some examples of thermal ink jet print heads are the Hewlett Packard DeskJet, and Canon iPIXMA iP4200, and some examples of piezo print heads are Brother MFC3360C, and Epson Stylus C120. Some suitable print heads are disclosed in U.S. Pat. No. 6,161,918, U.S. Pat. No. 4,490,728, and U.S. Pat. No. 6,648,463, the disclosures of which are incorporated herein by reference. The substrate can be any suitable substrate including plain paper, such as common electrophotographic copier paper; treated paper, such as photo-quality inkjet paper. The inks described in the present disclosure are particularly advantageous for printing on plain paper.

The following examples illustrate the disclosure without, however, being limited thereto.

EXAMPLES

In the following examples, unless otherwise stated, water is in a deionized form and ingredient amounts are indicated by weight percent of the total weight of ink.

GLOSSARY

BzMA=benzyl methacrylate
MAA=methyl acrylic acid
POEA=2-phenoxyethyl acrylate ester
HEA=hydroxylethyl acrylate ester
EHA=ethylhexyl acrylate ester
THF=tetrahydrofuran
2-pyrrolidone=2P
Liponic™ EG-1=ethoxylated glycerin humectant from Lipo Chemicals Inc. (Patterson, N.J.)
Crosslinking Agents from Nagase Chemicals Ltd. (Osaka, Japan):
  Denacol® 321: Trimethylolpropane Polyglycidyl Ether, water-insoluble
  Denacol® 920: Polypropylene Glycol Diglycidyl Ether, water soluble Structured Vinyl Polymeric Dispersants:

The structured vinyl polymeric dispersants used to make the dispersions were synthesized by established methods as described, for example, in U.S. Pat. No. 5,085,698. and 5,852,075 along with U.S. patent publication US2005/0090599.

In referring to the structured vinyl polymeric dispersants, a double slash indicates a separation between blocks, a single slash indicates a random copolymer, and "A-g-B" indicates a random A polymer grafted with a B segment. Thus, BzMN/MAA 13//10 is an AB diblock polymer with a first A block that is on average 13 BzMA units long, a B block that is on average 10 MAA units long. POEA/HEA/-g-MAA/ETEGMA is a POEA and HEA random polymer grafted with MAA and ETEGMA random macromonomer.

The following synthetic examples were based on group transfer polymerization (GTP) and chain transfer polymerization; although other types of polymerization processes can be used to generate similar types of polymers. In the case of the block polymers, the first block was at least 95% converted before adding the mixture of monomers for the next block. In all cases, the feed cycle strategy is described. However, the synthesis was terminated when 99% of the monomer was converted as detected by HPLC with mesitylene as an internal standard. The molecular weight reported (unless otherwise noted) was based on theoretical considerations. For the block polymers, all monomer ratios were reported as the mole ratios of the monomer components, and represented the theoretical degree of polymerization for each block or, set of monomer units. Block polymeric dispersants were routinely synthesized in dry THF and converted to a solution in 2-pyrrolidone (2P) by distilling the THF while replacing with 2P. For the graft polymers, all monomer ratios were reported as the weight rations of the monomer components.

For GTP polymerization, standard laboratory techniques for handling water sensitive chemicals were employed for the following examples. For example, glassware was extensively dried before use, monomers were stored over sieves, and cannulation procedures were used to keep material dry.

Gel Permeation Chromatography or GPC was used to verify predicted molecular weight and molecular weight distribution. The GPC system included a Waters 1515 Isocratic HPLC Pump, Waters 2414 Refractive Index Detector, 717 plus Waters Autosampler, Four Styregel Columns (HR 0.5, HR 1, HR 2, and HR 4) in series in a Waters Column Heater set to 40° C. Samples were eluted with Tetrahydrofuran (THF) at a flow rate of 1 mL/min. The samples were analyzed using Breeze 3.30 Software with a calibration curve developed from narrow molecular weight, polymethylmethacrylate (PMMA) standards. Based on light scattering data from Polymer Laboratories Ltd., the nominal, peak molecular weight for the PMMA standards were as follows: 300000, 150000, 60000, 30000, 13000, 6000, 2000, and 1000.

The structured vinyl polymeric dispersants are summarized in Table 1 below. Details include dispersant # from cross-referencing with ink and pigment dispersion data, polymer structure in terms of DP or chain length for each monomer unit, architecture (diblock vs. graft), number average molecular weight (Mn), and acid number, expressed as mg KOH/g solids. The measured acid number and Mn by GPC are included in the polymer preparation.

TABLE 1

Polymeric Dispersants

| Dispersant # | Polymer Structure (DP) | Architecture | Mol Wt Mn | Acid No |
|---|---|---|---|---|
| Dispersant 1 | 13BzMA//10MAA | Diblock | 3148 | 190 |
| Dispersant 2 | 13BzMA//13MAA/7.5ETEGMA | Diblock | 5337 | 146 |
| Dispersant 3 | EHA/HEA/-g-MAA/ETEGMA | Graft | NA | 114 |
| Dispersant 4 | POEA/HEA/-g-MAA/ETEGMA | Graft | NA | 114 |

Dispersant 1: Diblock 13BzMA//10MAA

A 5-liter round bottom flask was dried with a heat gun under nitrogen purge and equipped with a mechanical stirrer, thermocouple, $N_2$ inlet, drying tube outlet, and addition funnels. Tetrahydrofuran (THF), 802 g, was cannulated to the flask. Initiator (1,1-bis(trimethylsilyloxy)-2-methyl propene, 81.5 g (0.345 moles)) was injected followed by catalyst (tetrabutyl ammonium m-chlorobenzoate, 0.85 ml of a 1.0 M solution in acetonitrile). Catalyst solution (tetrabutyl ammonium m-chlorobenzoate, 0.85 ml of a 1.0 M solution in acetonitrile and THF, 7.35 g) was syringe pumped during the monomer feed. Monomer feed (trimethylsilyl methacrylate 554.9 g (3.53 moles), was added over 45 minutes while the reaction exothermed to 72° C. After a 1 hr hold, HPLC indicated greater than 97% monomer conversion, and then, monomer feed II Benzyl Methacrylate 803.5 g (5.10 mol), was added over 45 minutes. After a 60 min hold, HPLC indicated greater than 99% monomer conversion.

Then, 247.2 g of methanol were added, and THF and other volatile by-products were distillated by slowly heating to 120° C. while adding 2-pyrrolidone (2P). The final polymer solution was 40.55% solids with a measured acid number of 190.4 mg KOH/gram of polymer solids. The molecular weight of this polymer as measured by GPC was Mn 4638, Mw 5065, and PD 1.09.

Dispersant 2: Diblock 13BzMA//13MAA/7.5ETEGMA

A 5-liter round bottom flask was dried with a heat gun under nitrogen purge and equipped with a mechanical stirrer, thermocouple, $N_2$ inlet, drying tube outlet, and addition funnels. Tetrahydrofuran (THF), 1260 g, was cannulated to the flask. Initiator (1,1-bis(trimethylsilyloxy)-2-methyl propene, 54.9 g (0.1314 moles)) was injected followed by catalyst (tetrabutyl ammonium m-chlorobenzoate, 1.42 ml of a 1.0 M solution in acetonitrile). Catalyst solution (tetrabutyl ammonium m-chlorobenzoate, 1.0 M solution in acetonitrile and THF, 1.08 g) was syringe pumped during both the monomer feeds. Monomer feed 1 (trimethylsilyl methacrylate 486 g (1.71 moles) and ethyl triethylene glycol methacrylate, 436.6 g (0.986 moles)) was added over 60 minutes while the reaction exothermed to 65° C. After a 1 hr hold, HPLC indicated greater than 95% monomer conversion, and then, monomer feed II (benzyl methacrylate, 541.4 g (1.71 moles)) was added over 15 minutes.

The BzMA conversion was greater than 98% 90 min after the feed was complete. 212.0 g of methanol were added, and then the THF and other volatile by-products were distillated by slowly heating to 120° C. while adding 2-pyrrolidone (2P). The final polymer solution was 47% solids with a calculated acid number of 146 mg KOH/gram of polymer solids.

Dispersant 3: Graft EHA/HEA/-g-MAA/ETEGMA

MAA/ETEGMA (87.5/12.5) Macromonomer Preparation

Portion 1 was charged to a 5-liter round bottom flask equipped with a mechanical stirrer, thermocouple, $N_2$ inlet, drying tube outlet, and addition funnels and heated to mild reflux at 60-65° C. Portion 2 and Portion 4 were separately mixed until dissolved. Then Portion 2 and Portion 4 were simultaneously fed to the reaction flask while reaction was held at reflux temperature 64-70° C. Portion 2 feeding funnel was rinsed with Portion 3 immediately after Portion 2 was all charged over 240 minutes. Portion 3 feeding funnel was rinsed with Portion 5 immediately after Portion 4 was all charged over 270 minutes. After Portion 3 and Portion 5 were added to the flask, the reaction was held at reflux for an additional 120 minutes and then cooled to room temperature. The resulting macromonomer solution had solids of 35.78% and contained 87.5 wt % MAA and 12.5 wt % ETEMA.

| | Amount (g) |
|---|---|
| Portion 1 | |
| Acetone | 315.65 |
| Methanol | 287.64 |
| Isopropanol | 311.01 |
| Portion 2 | |
| ETEGMA | 76.94 |
| MAA | 538.55 |
| Methanol | 36.86 |
| Portion 3 | |
| Methanol | 64.62 |
| Portion 4 | |
| Acetone | 193.16 |
| Bis(borondifluoro diphenylglyoximato) cobaltate (II) ("DPG Co(II)") catalyst | 0.3876 |
| Vazo ®-52 initiator | 17.88 |
| Portion 5 | |
| Acetone | 32.32 |

A graft copolymer was then prepared from the macromonomer by charging the following components to a 5 liter flask equipped as above. Portion 1 was first charged to the flask and heated to reflux temperature at 70-75° C. Portion 2 was thoroughly mixed and charged to the flask at reflux. Portion 3 and Portion 4 were separately mixed and dissolved. Then Portion 3 and Portion 4 were simultaneously fed to the flask while maintaining reflux temperature at 75-80° C. Portion 3 and 80% of Portion 4 were fed over 240 minutes. The reaction was held at reflux for 60 minutes. Rest of Portion 4 was fed over 5 minutes. The reaction was held at reflux for an additional 60 minutes and cooled to room temperature. Then the volatiles, acetone, and isopropanol, were distillated by slowly heating to 120° C. while adding 2-pyrrolidone (2P). The final polymer solution was about 43.11% solids with a measured acid number of 123.7 mg KOH/gram of polymer solids. The final polymer composition in weight ratio was 38EHA/42HEA/-g-17.5 MAN2.5ETEGMA.

| | Amount (g) |
|---|---|
| Portion 1 | |
| Macromonomer (prepared above) | 452.5 |
| 2P | 340 |
| Portion 2 | |
| Terbutylperpivalate (Lupersol ®-11) | 3.8 |
| Isopropanol | 22.8 |

-continued

|  | Amount (g) |
|---|---|
| Portion 3 | |
| EHA | 285 |
| HEA | 315 |
| Portion 4 | |
| Terbutylperpivalate (Lupersol ®-11) | 18.8 |
| Isopropanol | 112.8 |

Dispersant 4: Graft POEA/HEA/-g-MAA/ETEGMA

Dispersant 4 was prepared by a process similar to that for preparing Dispersant 3 with the following exception: POEA was used to replace EHA. The final polymer solution was about 50.31% solids with a measured acid number of 122.6 mg KOH/gram of polymer solids. The final polymer composition in weight ratio was 38POEA/42HEA/-g-17.5 MAA/2.5ETEGMA.

Preparation of Pigmented Dispersions

Pigment Dispersion 1 (Magenta):

Pigment Dispersion 1 was made, using a media milling process and a lab-scale Eiger Minimill, model M250, VSE EXP from Eiger Machinery Inc. Chicago, Ill. The first step comprised the mixing of all the ingredients, that is, pigment, dispersants, KOH, pH adjuster, to provide a blended "premix". All liquid ingredients were added first, followed by the KOH solution which was used to neutralize "in situ" the dispersant and lastly the pigment. Mixing was done in a stirred 10 Liter stainless steel mixing vessel using a high-speed disperser, (HSD), with a 60 mm Cowels type blade attached to the HSD operated at 3500 rpm for a total mixing time of 2 hrs.

The pigment loading in the premix step was 25%.

| Ingredients | Amount (g) |
|---|---|
| Deionized water | 625 |
| Dispersant 1 (13BzMA//10MAA) | 992.6 |
| KOH Solution (45.6% Active, 70 mole % neutralization) | 117.3 |
| Pigment Red 122 (Sun chemical) | 1610.0 |

After premixing for 2 hrs. at 3500 rpm using the HSD, additional DI water was added to reduce pigment loading to 23% which gave the desired rheology and was the level used during the media milling stage.

| Ingredients | Amount (g) |
|---|---|
| Deionized water | 268.0 |

Next the media milling or, grinding step was performed by charging 820 grams of 0.5 mm YTZ zirconia media to the mill. The dispersion was processed using a re-circulation grinding process with a mill disk speed of 3500 rpm and flow rate of 350 grams per min. The milling was done using a staged procedure in which 20% of the DI water was held out during the grind and added after milling was completed. The dispersion was processed for a total of 4 hours milling time.

After completion of the milling step the final letdown of DI water was added and mixed in reducing the pigment loading in the dispersion to 10%.

| Ingredients | Amount (g) |
|---|---|
| Deionized water (final letdown) | 1319.3 |

The pigment dispersion was filtered through a 0.3 micron Chipwich filter available from Pall Trincor of East Falls, N.Y. and collected into a 1000 mL polyethylene container. The final pigment dispersion batch size totaled about 5000 grams at 13.2% pigment loading. The dispersion was then tested for pH, viscosity, and particle size.

The particle size was determined by dynamic light scattering using a Microtrac Analyzer, Largo Fla. For many of the dispersion steps, a Model 100 F or Y, Microfluidics System was used (Newton Mass.). D50 and D95 were reported. D50 was the average particle diameter defined as the particle diameter where 50 weight % of the particles were larger and 50 weight % of the particles were smaller. D95 was defined similarly as the diameter where 95 weight % of the particles were smaller.

Pigment Dispersion 2 (Cyan)

Pigment Dispersion 2 was prepared by a process similar to the Eiger Minimill process described for Pigment Dispersion 1 with the following exception: Pigment Dispersion 2 was Pigment blue, Dainichiseika® TRB-2, dispersed with Dispersant 2 (13BzMA//13MAA/7.5ETEGMA) at a P/D of 2.5 and 75 mole % neutralization. Dispersion 2 was processed using ultrafiltration techniques to remove co-solvent(s) and other contaminants, ions or impurities.

Pigment Dispersion 3 and 4 (Magenta):

Pigment Dispersion 3 and 4 were prepared by a process similar to the Eiger Minimill process described for Pigment Dispersion 2 with the following exception: Dispersion 3 was Pigment Red 122 (Sun Chemical) dispersed with Dispersant 3 (EHA/HEA/-g-MAA/ETEGMA) at a P/D of 2.0 and 100 mole % neutralization. Dispersion 4 was Pigment Red 122 (Sun Chemical) dispersed with Dispersant 4 (POEA/HEA/-g-MAA/ETEGMA) at a P/D of 2.0 and 100 mole % neutralization. Dispersions 3 and 4 were processed using ultrafiltration techniques to remove co-solvent(s) and other contaminants, ions or impurities.

TABLE 2

Initial Pigment Dispersion Properties at Room Temperature

| Dispersion no. | Dispersant | Pigment | pH | D50 (nm) | D95 (nm) |
|---|---|---|---|---|---|
| Dispersion 1 | Dispersant 1 | PR122 | 7.3 | 96 | 168 |
| Dispersion 2 | Dispersant 2 | Dainichiseika ® TRB-2 | 7.69 | 93 | 211 |
| Dispersion 3 | Dispersant 3 | PR122 | 7.35 | 121 | 210 |
| Dispersion 4 | Dispersant 4 | PR122 | 7.18 | 124 | 183 |

Crosslinked Pigment Dispersion Preparation:

In the crosslinking step, the crosslinking agent was mixed with the above aqueous pigment dispersion, and heated at 60°-80° C., with efficient stirring, for 6 to 8 hours. After the crosslinking reaction was finished, pH was adjusted to at least about 8.0, if needed. Table 3 summarizes the crosslinking recipe for the aqueous pigment dispersion crosslinking. Table 4 summarizes the final crosslinked pigment dispersion's physical properties. As shown in Table 4, crosslinking had no significant impact on dispersion particle size.

TABLE 3

Crosslinking Formulation

| Crosslinked Dispersion no. | Dispersion no. | Pigment | Crosslinking moiety | Crosslinking Compound | Mole ratio Crosslinker:COOH |
|---|---|---|---|---|---|
| XL-1 | 1 | PR122 | COOH | Denacol ® 321 | 1:4 |
| XL-2 | 2 | Dainichiska TRB-2 | COOH | Denacol ® 321 | 1:4 |
| XL-3 | 3 | PR122 | COOH | Denacol ® 321 | 3:5 |
| XL-Comp1 | 1 | PR122 | COOH | Denacol ® 920 | 1:4 |
| XL-Comp2 | 4 | PR122 | COOH | Denacol ® 920 | 1:2 |

TABLE 4

Crosslinked Dispersion Properties

| Crosslinked Dispersion no. | pH | D50 (nm) | D95 (nm) |
|---|---|---|---|
| XL-1 | 7.49 | 102 | 170 |
| XL-2 | 8.90 | 97 | 198 |
| XL-3 | 7.89 | 98 | 189 |
| XL-Comp1 | 7.79 | 102 | 166 |
| XL-Comp2 | 8.29 | 111 | 176 |

Ink Preparation and Stability Testing:

Inks were prepared by stirring together the pigment dispersion and A type and B type aqueous ink vehicle ingredients listed in Table 5. The dispersion was added in an amount that provided 3% pigment solids in the final ink. Ink physical properties including viscosity, pH, and particle size (D50 and D95) were measured. Pigment particle size growth seen immediately after dispersion was formulated into the A type ink was an indication of dispersion instability.

A second ink was formulated using the B type vehicle. To test ink stability with B type vehicle composition, ink particle size was remeasured after ink was conditioned through a T-cycle aging process. In the T-cycle aging process, ink temperature was raised to and held at 70° C. for 4 hours and then was cooled to −40° C. and held at −40° C. for 4 hours. This temperature cycling was repeated 5 times. Pigment particle size growth after T-cycle aging of the B type ink was also an indication of dispersion instability. Stabilities of pigment dispersions before and after the crosslinking process were both tested. Results were summarized in Table 6, 7, and 8.

TABLE 5

Aqueous ink vehicle Composition

| Vehicle Composition (weight %) | A type | B type |
|---|---|---|
| Liponic ™ EG-1 | | 5.00 |
| 2P | 5.00 | 9.00 |
| Butyl Cellosolve | 10.00 | |
| Butyl Carbitol | 16.00 | |
| Zonyl ® FSO | | 0.10 |
| Surfynol ® SEF | | 0.70 |
| Surfynol ® 465 | | 0.20 |
| Crodafos ® N-3 | | 0.50 |
| Proxel ® GXL | | 0.20 |
| Water | Balance | Balance |

TABLE 6

Ink Type A Stability Results

| | Room Temperature | | | |
|---|---|---|---|---|
| Dispersion no. | Viscosity (cps) | D50 (nm) | D95 (nm) | Accusizer (×10$^7$) counts/ml) |
| XL-1 | 6.68 | 142 | 244 | 0.36 |
| XL-Comp1 | 7.94 | 238 | 411 | 1.39 |
| 1 | 34.20 | 265 | 395 | 1.42 |
| 2 | NA | 90 | 208 | NA |
| XL-2 | NA | 87 | 183 | NA |

TABLE 7

Ink Type B Viscosity and Particle Size Results
(Room temperature and after T-cycle Aging)

| Room Temperature | | | After T-cycle | | |
|---|---|---|---|---|---|
| Viscosity (cps) | D50 (nm) | D95 (nm) | Viscosity | D50 (nm) | D95 (nm) |
| 4.71 | 114.0 | 201.0 | 2.73 | 388.0 | 650.0 |
| 2.75 | 115.0 | 222.0 | 2.63 | 123.0 | 263.0 |
| 3.59 | 225 | 441 | 8.52 | 361 | 667 |
| 2.83 | 108 | 202 | 4.85 | 226 | 485 |

TABLE 8

Ink Type B Viscosity and Particle size % Growth after T-Cycle Aging

| Dispersion no. | Viscosity change (%) | D50 change (%) | D95 change (%) |
|---|---|---|---|
| 3 | −42% | 240% | 223% |
| XL-3 | −4% | 7% | 18% |
| 4 | 137% | 60% | 51% |
| XL-Comp2 | 71% | 109% | 140% |

As shown in Table 6, 7 and 8, crosslinked dispersions XL-1, XL-2, and XL-3 of this disclosure demonstrated good ink Stability. Comparative dispersions crosslinked with a water-soluble crosslinking agent show less stability.

What is claimed is:

1. An aqueous dispersion comprising a solid particle and a structured vinyl polymeric dispersant, wherein said structured vinyl polymer dispersant comprises at least one hydrophilic segment and at least one hydrophobic segment, the hydrophilic segment comprising at least one crosslinkable moiety, wherein the crosslinkable moiety is cross-linked with a crosslinking agent that is substantially insoluble in the aqueous ink vehicle, wherein the hydrophobic segment does not include an oligoether moiety, and wherein the aqueous dispersion or an ink containing the dispersion is resistant to increase in viscosity and increase in pigment particle size growth after changes in factors which destabilize dispersions.

2. The aqueous dispersion of claim 1 wherein the solid particle is selected from the group consisting of a colorant, filler, metallic particle, pharmaceutically active compound, polymer particle and hollow glass sphere.

3. The aqueous dispersion of claim 2 wherein the colorant is a pigment or an insoluble dye.

4. The aqueous dispersion of claim 1 wherein the crosslinked hydrophilic segment forms a matrix around the solid particle where the matrix is resistant to changes in aqueous ink vehicle composition and changes in temperature.

5. The aqueous dispersion of claim 1 wherein the structured vinyl polymeric dispersant is selected from the group consisting of a block polymer, graft polymer, tapered polymer and branch polymer.

6. The aqueous dispersion of claim 1 wherein the structured vinyl polymeric dispersant is a block polymer prepared by the Group Transfer Polymerization technique.

7. The aqueous dispersion of claim 1 wherein the structured vinyl polymeric dispersant is a graft polymer prepared using chain transfer agents.

8. The aqueous dispersion of claim 1 wherein the hydrophobic segment comprises a hydrophobic monomer selected from the group consisting of alkyl acrylates, aryl acrylates, alkyl aryl acrylates, alkyl methacrylates, aryl methacrylates, alkyl aryl methacrylates, wherein the alkyl group comprises 1-12 carbon atoms and/or the aryl group comprises 6-12 carbons; polymerizable vinyl aromatic monomers; and aliphatic hydrocarbon monomers.

9. The aqueous dispersion of claim 1 wherein the hydrophilic segment comprises a hydrophilic monomer selected from the group consisting of an acid monomer, an amine-containing monomer, a monomer having oligoether moieties of the Formula (I):

$$CH_2=CRC(O)O(CH_2CH_2O)_nR_1 \quad \text{Formula (I)}$$

wherein R=H or methyl; $R_1=C_{1-4}$ alkyl, $C_{6-12}$ aryl, or $C_{1-12}$ alkyl-$C_{6-12}$ aryl, and n=1 to 20.

10. The aqueous dispersion of claim 9 wherein the acid monomer is selected from the group consisting of acrylic acid, methacrylic acid, acrylamidomethylpropane sulfonic acid, itaconic acid, maleic acid and styrene sulfonic acid.

11. The aqueous dispersion of claim 9 wherein the amine-containing monomer is selected from the group consisting of 2-dimethylaminoethyl methacrylate, 2-dimethylaminoethyl acrylate, 2-diethylaminoethyl methacrylate, and 2-diethylaminoethyl acrylate.

12. The aqueous dispersion of claim 9 wherein the monomer having oligoether moieties of the Formula (I) is selected from the group consisting of ethoxyethyl methacrylate, butoxyethyl methacrylate, ethoxytriethylene methacrylate, methoxypolyethylene glycol methacrylate, and 2-ethoxytriethylene glycol methacrylate.

13. The aqueous dispersion of claim 9 wherein the monomer is neutralized.

14. The aqueous dispersion of claim 1 wherein the mole ratio of the crosslinkable moiety and crosslinking functional group on the crosslinking agent is from about 10:1 to about 1:1.5.

15. The aqueous dispersion of claim 1 wherein the crosslinking agent is selected from the group consisting of epoxide, carbodiimide, oxazoline, isocyanate, m-tetramethylxylene diiscyanate (TMXDI), isophorone diisocyanate (IPDI), trimethylopropane polyglycidyl ether, water-insoluble epoxide resin, oxazoline-functional polymers, polycarbodiimide resin, silane and mixtures thereof.

16. The aqueous dispersion of claim 1 wherein the crosslinkable moiety is an acid and the crosslinking agent comprises a crosslinking functional group selected from the group consisting of epoxide, carbodiimide, oxazoline and mixtures thereof.

17. The aqueous dispersion of claim 1 wherein the crosslinkable moiety is a hydroxyl group and the crosslinking agent comprises a crosslinking functional group selected from the group consisting of epoxide, silane, isocyanate, and mixtures thereof.

18. The aqueous dispersion of claim 1 wherein the crosslinkable moiety is an amino group and the crosslinking agent comprises a crosslinking functional group selected from the group consisting of epoxide, silane, isocyanate, carbodiimide isocyanate and mixtures thereof.

19. The aqueous dispersion of claim 1 wherein the crosslinking agent is selected from the group consisting of m-tetramethylxylene diiscyanate (TMXDI), isophorone diisocyanate (IPDI), trimethylopropane polyglycidyl ether, water-insoluble epoxide resin, oxazoline-functional polymers, polycarbodiimide resin, and silane.

20. The aqueous dispersion of claim 1 wherein the pH of the aqueous dispersion is at least about 8.0.

21. The aqueous dispersion of claim 1 wherein the viscosity of the aqueous dispersion is 8.52 mPas or less.

22. The aqueous dispersion of claim 1 wherein the viscosity of the aqueous dispersion or that of an ink containing the dispersion does not increase after changes in temperature.

23. The aqueous dispersion of claim 1 wherein the viscosity of the aqueous dispersion or that of an ink containing the dispersion decreases after changes in temperature.

24. The aqueous dispersion of claim 1 wherein the pigment particle size $D_{50}$ of the dispersion or an ink containing the dispersion does not increase more than 7% and the pigment particle size $D_{95}$ of the dispersion or an ink containing the dispersion does not increase more than 18% after changes in temperature.

25. The aqueous dispersion of claim 1 further comprising a surfactant selected from the group consisting of glycol ethers and 1,2-alkanediols.

* * * * *